Figure 1:
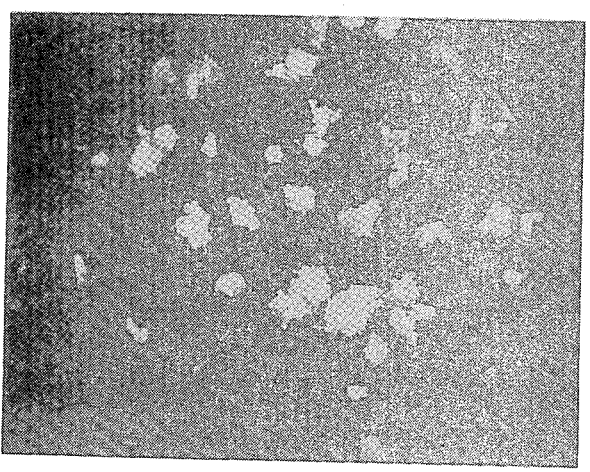

INVENTORS
John M. DeBell
Roy A. White
Paul L. Tarko
BY Chapin & Neal
Attorneys 3,370,105
PROCESS FOR MANUFACTURE OF
IMPACT POLYMERS
John M. De Bell, Enfield, Roy A. White, Somers, and Paul L. Tarko, Suffield, Conn., assignors to De Bell & Richardson, Inc., Hazardville, Conn., a corporation of Connecticut
Filed May 7, 1963, Ser. No. 278,707
12 Claims. (Cl. 260—880)

This invention relates to tough polymer compositions and more particularly to graft polymerization in aqueous suspension of ethylenic monomers on elastomers by converting natural or synthetic rubbery polymers in latex form to stable aqueous suspensions in the presence of monomers and then polymerizing to obtain high-impact products.

Graft polymers have been made from intimate mixtures of rubbery materials and polymerizable monomers. They ordinarily result in mixtures of polymer chains chemically connected to the base rubbery material, along with some homopolymer, and will in this application be termed graft polymers. Previous methods used mass or bulk polymerization; emulsion polymerization; or suspension polymerization. In bulk polymerization, especially where the elastomer and the polymers are soluble in the monomers, a physical mixture is made and polymerized. There are severe limitations because of limited solubility, of high viscosity resulting from the rubbers used, and of the difficulty of disintegrating the tough masses formed.

As ordinarily practiced, suspension polymerization is a special case of bulk polymerization in which the reactants are suspended as droplets in an inert medium such as water, which permits excellent temperature control, hence uniform quality product. Suspension attempts to graft polymerize monomers on rubber have often involved solution of the rubber in the monomer and subsequent dispersion. However, a high-molecular-weight rubber imposes a severe limitation because unless the concentration of the rubber is very low, the viscosity is so high that dispersion is difficult.

Emulsion polymerization to form grafts has worked well because the rubbers are often available as stable latexes. The monomers could be added to the latexes, would ultimately find their way to the dispersed rubbers, and could polymerize with considerable speed but with good temperature control. However, by their very nature the emulsions contain water-soluble constituents; and the desired products can be obtained only by coagulation processes, spray-drying, or other methods which are difficult, labor-consuming, costly, and do not readily permit the removal of the emulsifying constitutents, so that these latter turn up as undesirable impurities in the otherwise water-resistant graft polymers. In some cases, particularly where combinations of acrylonitrile, butadiene, and styrene are involved, it has been found convenient to mix latexes and to precipitate them simultaneously as a means of producing quite uniform physical mixtures of polymers. However, physical mixtures, no matter how well prepared, have had many drawbacks in mechanical properties in comparison with graft polymers by the above methods.

The principal object of this invention is to provide an improved process for the graft polymerization of monomers on elastomers.

Another object of this invention is to provide a method of graft polymerizing ethylenic monomers onto elastomer materials which enables wide variations in the compositions of the polymers produced. Products may thus be readily manufactured in all impact classifications from the normal type to the super impact materials and masterbatch stocks.

In particular, and as compared with processes heretofore available, there is practically no limit as to the proportion of high-molecular-weight elastomer which can be used. Where, for example, the impact styrenes (rubber and styrene graft polymer) have had difficulty in obtaining more than 20% rubber, this invention permits proportions all the way from 1% to 95%. Even at 45% rubber the suspension can be polymerized at a high solids ratio approacting 50% of dispersed phase to 50% aqueous phase.

Not only can wide proportions of elastomers be used, but in addition the elastomer-rich compositions can later be blended with homopolymers to give a wide range of impact characteristics and uniform qualities highly superior to anything obtained by mere mechanical mixtures of a rubber and a homopolymer.

It is a further object of this invention to provide an improved method of making graft polymers which can be readily purified, handled and packaged. Furthermore, only mild agitation is required for polymerization so that the polymerization may be carried out in tubes. In addition the relatively low aqueous phase minimizes loss of somewhat water soluble monomers. Moreover, the procedures embodying the invention are particularly suitable for the preparation of impact styrene and acrylonitrile-butadiene-styrene resins.

In accordance with this invention an elastomer latex and one or more monomers are dispersed in aqueous medium and then converted to a stable aqueous suspension for polymerization.

Figure 2:
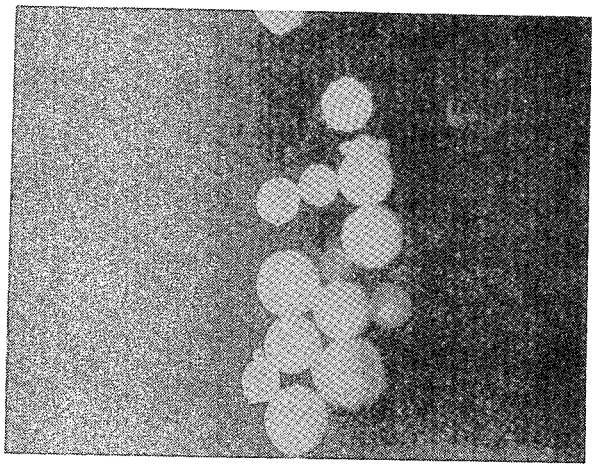
Figure 3:
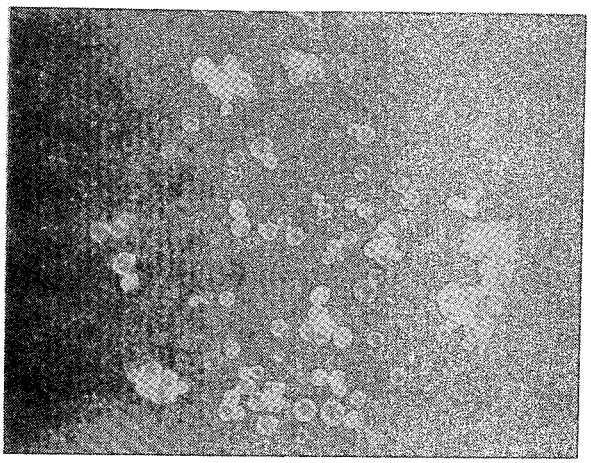

The above and other objects and advantages of this invention will be more readily apparent from the following description with reference to the accompanying illustrations in which:

FIG. 1 is a photograph showing graft polymer clumps, magnified twenty times, obtained by methods of the prior art; and FIGS. 2 and 3 are photographs showing graft polymer beads, magnified one hundred times, obtained by the methods embodying this invention.

It has been found that by employing a combination emulsion-suspension process, the advantages of both methods can be retained while the disadvantages are eliminated. In general, this invention is carried out by intermixing an elastomer latex and the desired monomer or monomer mixtures and small amounts of modifiers and/or catalytic agents. The emulsion is then converted to a suspension of discrete particles of controlled-shape so that polymerization may then be conducted by suspension means. In this way, without any further coagulation or laborious processing methods, the aqueous phase can be merely drained from the suspension beads at the end of polymerization. Water-soluble impurities may be removed completely by simple washing since they have been rejected to the surface of the beads. The resulting bead polymer is thus clean, uncontaminated, dries readily by continuous processes, and is in a highly preferred condition for both handling and further processing. Conversion of the emulsion to an ordinary suspension is achieved by coalescence or controlled partial coagulation whereby the emulsion or colloidal sized particles are increased to larger suspension size particles. As is well known in the polymer art, the fine particles in emulsions will not settle on standing, whereas particles in suspension will settle if not agitated.

More specifically the process embodying this invention comprises the following steps:

(1) A latex and catalyzed monomer are mixed in the presence of a suitable suspending agent and any desired modifiers.

(2) The emulsion is converted to a suspension by controlled partial coagulation whereby the colloidal particles disappear, the power of the emulsifying agent is lost and suspended particles generally greater than 0.005 inch in diameter are obtained in a stable condition.

(3) With careful agitation, the suspension is polymerized.

(4) At the end of the polymerization, optionally any excess monomer may be recovered by distillation.

(5) The suspension particles are drained or centrifuged to remove the aqueous phase, where water-washing may be conducted if desired, then the product is dried and is ready for use.

An important aspect of this invention is that conversion from emulsion to suspension is carried out before polymerization is initiated, i.e. before substantial polymerization takes place. In addition, the particles in suspension are found to be generally spherical in shape, as shown in FIGS. 2 and 3, thus permitting a higher ratio of final solids to aqueous phase.

The partial coagulation is advantageously carried out by careful acidification while stirring. The success of this technique is demonstrated by the appearance of comparatively large spherical particles as in FIG. 2. For the purposes of this invention, conversion from emulsion to stable suspension suitable for polymerization will be referred to as "partial coagulation" in which the emulsion disappears completely; but the small, uniform, usually spherical suspension particles do not further coalesce to large clumps or an unmanageable mass.

It has been found that controlled partial coagulation of a monomer latex mixture can be accomplished by acidification using an acid such as hydrochloric or acetic acid. The polymer shown in FIG. 2 was obtained by acidification technique. Multi-valent ions, such as aluminum salts are also effective coagulating agents, and aluminum sulphate has been used to effect partial coagulation of monomer-latex mixtures. Agitation also has an effect on the size and shape of the particles or beads produced. In fact sufficient agitation may be used without acidification to obtain round beads. The polymer shown in FIG. 3 was obtained using intensive agitation only. Careful control of coagulation, such as by the addition of an acid acting material while observing the pH of the emulsion, will result in the formation of spherical particles. It has been discovered that slow addition of acid, while stirring, to obtain a reduction in the pH from about 8 to 3 will gradually and uniformly neutralize the emulsifying agent, such as soap, at a desired rate whereby spherical particles of uniform size are produced.

In carrying out this invention a wide range of elastomers have been successfully employed. These include in latex form natural rubber, butadiene-styrene rubber, acrylonitrile-butadiene rubber, polyisoprene, polychloroprene and polybutadiene. It is anticipated that unsaturated ethylene, propylene, and isobutylene rubbers, when available as a latex, may also be used in carrying out this invention.

Suitable monomers which can be graft polymerized in accordance with this invention are ethylenic monomers and mixtures thereof, including: styrene, vinyl toluene, vinylidene chloride, ethyl acrylate, methyl methacrylate and acrylonitrile. Alpha methyl styrene has also been used, and although slower, is nevertheless suitable.

Various suspending agents or systems, both organic and inorganic, may be used in carrying out this process. Examples of suitable suspending agents include polyvinyl alcohol, methyl cellulose, carboxymethyl cellulose, hydroxyethyl cellulose, etc. Calcium hydroxyphosphate is effective with higher rubber/styrene ratios. The polyvinyl alcohol selected should preferably be such that a 4% solution at 20° C. would have a viscosity of at least 20 centipoises. The polyvinyl alcohol should be water soluble.

Suitable catalysts include benzoyl peroxide, lauroyl peroxide, azo-bis-isobutyronitrile, and the like. It may also be desirable to add anti-oxidants such as 2,6-di-tertiary-butyl-4-methyl phenol. Chain transfer agents such as dodecyl mercaptan may be employed for controlling molecular weight buildup and cross linking between the elastomer molecules to yield a product having a high melt flow index. Surface active agents may also be employed to assist the suspending agent, e.g., sodium propyl phosphate, alkyl aryl sulfonates, and the like.

The following specific examples, in which parts refers to parts by weight, are illustrative of the method and materials used in carrying out this invention:

EXAMPLE I

A styrene monomer charge of 550 grams containing as a plasticizer 2% butyl stearate, 0.15% by weight benzoyl peroxide catalyst and 0.1% 2,6-di-tertiary-butyl-4-methyl phetnol as an anti-oxidant was mixed with 139 grams butadiene-styrene latex of 70% solids, diluted with 580 ml. of water, 120 ml. of 1% polyvinyl alcohol and a dispersing agent of 12 ml. of 5% sodium propyl phosphate. The polyvinyl alcohol was from 88% hydrolyzed polyvinyl acetate and had a viscosity of 40 centipoises in 4% solution at 20° C. The latex used was a composition of 25 parts sytrene and 75 parts butadiene copolymer having a particle size of 0.2 micron, rosin and fatty soap as emulsifying agent whereby the emulsion had a pH of 10.

This combination of materials was thoroughly intermixed for 10 minutes. To accomplish this, a 6 blade turbine was rotated at 1400 r.p.m.

The emulsion was then partially coagulated by the addition of hydrochloric acid with continued intensive agitation of the mixture; 9.5 ml. of 4% HCl was slowly added over a 5 minute period to neutralize the emulsifying agent. The pH was reduced to 3, followed by an additional 5 minutes of stirring.

The suspension was then charged to a jacketed reactor and polymerized at 80° C. for 17 hours. During polymerization the suspension was gently agitated at slow speed sufficient to maintain the disperse phase in suspension but not so intensive as to cause agglomeration. The disperse phase settled readily when the stirring was stopped.

After recovery from the reactor, the particles were microscopically examined and found to be spherical in shape. The spherical shaped beads were gauged on sieves of from 20–100 mesh-Tyler Standard Screens with the following results:

| Mesh: | Percent |
|---|---|
| 20 | 4 |
| 40 | 4 |
| 60 | 7 |
| 80 | 10 |
| 100 | 21 |

54% passed through 100 mesh sieve.

The bead product was pressed to form a strip, and stretched in the elongation range of 100% at 0.1 inch per minute.

EXAMPLE II

The process of Example I was repeated except that no acid was added to neutralize the emulsifying agent. The resulting product consisted of irregular shaped large lumps and huge agglomerations of these lumps. Stirring as in Example I during polymerization became impossible. Moreover, considerable latex remained and elongations of only 10% were obtained from pressings of the product.

EXAMPLE III

A monomer mixture consisting of 30 parts styrene monomer, 5 parts butyl stearate plasticizer, 0.07 part benzoyl peroxide catalyst and 0.3 part 2,6-di-tertiary-butyl-4-methyl phenol was added to a mixture of 200 parts water, 100 parts butadiene styrene, 75/25 latex (70% solids), 40 parts 1% polyvinyl alcohol solution, and 4 parts 5% sodium propyl phosphate solution.

This mixture was intensively agitated for 10 minutes and while being agitated, 4% HCl was slowly added to reduce the pH to 3. Mixing was continued for 5 minutes.

The acid and intensive agitation resulted in uniform neutralization of the emulsifying agent of the latex with a uniform partial coagulation or coalescence of the disperse phase whereby the particles increased to greater than colloidal size. This method thus produced a regular suspension in which the particles were spherical in shape. The suspension was then charged into a reactor and while being agitated to maintain the particles in suspension, polymerization was carried out for 26 hours at 90° C.

EXAMPLE IV 22 parts of polymer from Example III were compounded on 285° F. mill rolls with 78 parts of general purpose polystyrene granules (Dow 666) to yield an impact polystyrene. This was molded at 350° F. This blend was compared with a similarly compounded impact polystyrene of the same final composition based on Bakelite TMD 2600 and Dow 666 polystyrene. Properties were found to be comparable with the material of this example exhibiting a greater elongation, as indicated in tabular form following:

| Preparation of Sample | Example IV, 22/78, percent | TMD 2600, 22/78, percent |
|---|---|---|
| Mill 5 min. at 300° F., press 3 min. at 350° F_ | 6-20 | 5 |
| Mill 5 min. at 285° F., press 3 min. at 300° F_ | 4-10 | 0-5 |

EXAMPLE V 71 parts of butadiene-styrene (75/25) 70% solids emulsion were graft polymerized with 50 parts of styrene by the same method as described in Example III to yield a suspension polymer. After drying, 22 parts were milled with 78 parts of polystyrene pellets at 300° F. for 2 minutes on differential rolls. The product was molded at 350° F. for 5 minutes. Elongation tests resulted in 21% elongation before breakage. A similar product containing 40 parts styrene and 60 parts of rubber solids in the same 22/78 graft/polystyrene ratio had an elongation of 43% after milling at 285° F. for 5 minutes, and pressing at 350° F. for 3 minutes. In contrast 22 parts commercial Bakelite TMD 2600 when milled with 78 parts styrene and pressed were found to have an elongation of 5%.

EXAMPLE VI 21.2 parts of alpha methyl styrene, 63.8 parts methyl methacrylate and 1 part lauroyl peroxide were graft polymerized on 15 parts of styrene-butadiene 25/75 70% latex at 55° C. for 72 hours. The product was easily processable to obtain high impact strength heat resistant polymer.

EXAMPLE VII

An aqueous suspending medium was prepared by adding 40 parts of 1% solution of polyvinyl alcohol, 4 parts of 5% solution of sodium propyl phosphate to 350 parts water. 21.4 parts styrene-butadiene 25/75 70% latex were introduced into the aqueous medium. While mixing, a monomer mixture of 56.7 parts styrene monomer, 28.3 parts acrylonitrile monomer, 0.85 part lauroyl peroxide, and 0.085 part dodecyl mercaptan were added. This combination was intensively agitated for 5 minutes and while being so agitated partial coagulation was brought about by the addition of acetic acid. The acid was added slowly while the emulsifying soaps were being neutralized to reduce the pH from about 10 to 4, forming a stable suspension which was then polymerized at 95° C. for 17 hours with moderate agitation. The resulting product was granular. A pressing from the granular product was tough and could be bent 180 degrees without fracture.

EXAMPLE VIII

To 300 parts water containing 0.1% polyvinyl alcohol, 26.3 parts of a polybutadiene latex (57% solids) were added. In addition 85 parts of styrene monomer containing 2% butyl stearate and 0.15% benzoyl peroxide were added. The mixture was intensively agitated and partial coagulation instigated by the addition of acetic acid until the pH of the mixture was reduced to 4.5. Subsequently the suspension was polymerized at 80° C. for 23 hours. The product was granular graft polymer from which molded products were made which could be bent 180 degrees without damage.

EXAMPLE IX

To 300 parts water containing 0.2% polyvinyl alcohol, 0.004% sodium dodecyl benzene sulfonate, 57 parts of 26.3% solids polychloroprene latex were added. 85 parts of mixed monomers consisting of 97.7 distilled vinylidene chloride and 2.0% ethyl acrylate and 0.3% lauroyl peroxide were added. The elastomeric material in the aqueous medium consisted of 15 parts polychloroprene. Partial coagulation with intensive agitation was accomplished by the addition of acid, converting the disperse phase from colloidal to suspension size particles. Thereafter the batch was polymerized 16 hours at 62° C. to yield a granular product which was molded to obtain tough, stiff objects.

EXAMPLE X

A suitable vessel was charged with 22 parts distilled water containing 1 part 5% sodium propyl phosphate solution, 20 parts sodium phosphate solution (.38 part

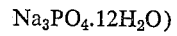

$Na_3PO_4 \cdot 12H_2O$)

and 17.8 parts polybutadiene latex containing 10.3 parts rubber solids. After thorough mixing, 15.2 parts styrene monomer containing 0.076 part benzoyl peroxide were added. The mixture was intensively agitated for 5 minutes and thereafter, while continuing the intensive agitation, 20 parts of an aqueous solution containing 0.246 part of calcium chloride dihydrate was added throughout a 30 second time interval. This converted the emulsion to suspension size particles. The pH was next adjusted with an acetic acid to about 3.2 and then with sodium hydroxide to about 5.9. The sodium hydroxide was added to return the pH to about 5 to 7 in which calcium phosphate suspension systems function most efficiently. Thereafter, the charge was polymerized for 18 hours at 80° C. with mild agitation. A screen analysis of the resulting suspension polymer showed the following:

*Tyler Standard Screen test*

| On— | Percent |
|---|---|
| 10 | 1.5 |
| 20 | 32.2 |
| 40 | 61 |
| 60 | 5.2 |
| 80 | Trace |
| Through 80 | 0 |

EXAMPLE XI

In accordance with the process of Example VII a monomer mixture consisting of 2 parts of ethyl acrylate, 1 part of glycidyl methacrylate, 87 parts distilled vinylidene chloride, 0.3 part of lauroyl peroxide were thoroughly mixed. This was added to a mixture of 14.2 parts 25/75 styrene-butadiene latex (10 parts rubber solids) in 200 parts water containing 2 parts of 5% sodium propyl phosphate, and 80 parts of a 1% polyvinyl alcohol solution. The combination was intensively agitated for 7 minutes and then with acetic acid the pH was adjusted to 4.5. Agitation was continued for 3 more minutes. Thereafter, polymerization with merely sufficient agitation to maintain the particles in suspension was continued for 20 hours at 62° C. A yield of 50 parts granular solids was obtained containing the original 10 parts of rubber solids. Heat distortion temperature of molded solids was 66° C. with a notched impact strength of 2.5 ft. lbs./inch of notch.

EXAMPLE XII

Example XI was repeated using 7.1 parts of styrene butadiene latex which contains 5 parts solids. After suspension was formed, polymerization was carried out for 24 hours at 62° C. The granular product contained 9.7% rubber. Heat distortion of a pressed sample was 130° C. at 66 p.s.i.

EXAMPLE XIII

In accordance with the methods set forth in Example VIII, 83 parts of styrene monomer containing 2 parts of butyl stearate and 0.207 part azo-bis-isobutyronitrile were thoroughly mixed and added to 300 parts emulsion containing 21.4 parts styrene butadiene 25/75 70% latex, 40 parts 1% polyvinyl alcohol and 4 parts 5% sodium propyl phosphate solution. The mixture was intensively agitated for 5 minutes, the agitation was continued and the acetic acid added to reduce the pH to 4. Thereafter, the charge was polymerized for 40 hours at 80° C., while agitating or stirring the suspension not substantially greater than necessary to maintain the particles in suspension. A granular product was obtained from which pressings were made which could be bent 360 degrees a number of times without breaking.

EXAMPLE XIV

A vessel was charged with a monomer mix comprising 100 grams styrene, 100 grams vinyl toluene, 4 grams butyl stearate, 0.5 gram benzoyl peroxide and 0.2 gram 2,6-di-tertiary-butyl-4-methyl phenol anti-oxidant.

In a second vesel, an aqueous medium was prepared comprising 47 grams ditsilled water, 10 grams 1% polyvinyl alcohol (medium molecular weight 88% hydrolyzed) and 1 gram 5% sodium propyl phosphate solution. A styrene butadiene rubber latex 8.57 grams (25/75 70%) was dispersed in the aqueous medium and 34 grams of the monomer mixture was added.

The mixture contained in the second vessel was then agitated using a Premier Mill DD dispersator, which has a rotating slotted barrel. The dispersator speed was gradually increased over a 10-minute period from 0 to 9000 r.p.m. The 9000 r.p.m. was continued for 20 more minutes. Thereafter the mixture was placed in a vessel, flushed with nitrogen and sealed. The ambient temperature was increased to 80° C. and the charge polymerized for 24 hours without agitation.

It was found that the polymer could be readily redispersed. Microscopic examination of the polymer showed small round beads as shown in FIG. 3.

It was estimated that the dispersator running at 9000 r.p.m. generated 28 B.t.u. per pound of slurry for the 20 minutes of agitation. It will, of course, be appreciated by one skilled in the art that this constitutes an extraordinary degree of agitation far greater than usually employed in such processes where perhaps 0.4 B.t.u. per pound of slurry is utilized during mixing.

From the above example it will be realized that controlled partial coagulation may be achieved by agitation without acid addition.

EXAMPLE XV

A charge similar to that of Example XIV was agitated for 5 minutes at 1400 r.p.m. Three cc. of 10% potassium aluminum sulphate was added with continued agitation reducing the batch to a final pH of 3.9. The charge was then polymerized for 20 hours at 90° C. without agitation. The polymer product was in the form of round particles.

A test was also conducted with acceptable results using calcium chloride solution to cause precoagulation, prior to polymerization.

In addition to polyvinyl alcohol a number of other suspending agents were successfully employed including hydroxy ethylated cellulose, sodium carboxymethyl cellulose, methyl cellulose and calcium hydroxy phosphate.

EXAMPLE XVI

A monomer mixture of 315 grams styrene monomer, 6.3 grams butyl stearate, 0.32 gram benzoyl peroxide, 0.48 gram 2,6-di-tertiary-butyl-4-methyl phenol was introduced into an aqueous medium comprising 250 grams water, 10 grams 5% sodium propyl phosphate, 100 grams 1% polyvinyl alcohol solution, and 322.5 grams (70% solids) butadiene styrene 75/25 latex.

The batch was stirred for 5 minutes and then intensively agitated at 1800 r.p.m. during which 54 cc. of 2% HCl was added to reduce the pH to 3. Additional 100 grams of 1% polyvinyl alcohol were then added with 1800 r.p.m. agitation continued for 5 minutes. Thereafter the disperse phase was polymerized in a nitrogen atmosphere at 90° C. for 24 hours with low intensity agitation merely sufficient to maintain the dispersion.

The polymer was then filtered, washed, dried, and screened through a 10 mesh sieve. 128 grams of the screened polymer was then mixed by tumbling with 453 grams polystyrene beads. This mix was extruded using a 1 inch extruder, 12:1 length to diameter ratio. A $\frac{1}{16}$ inch die orifice was used with 40 and 80 mesh sieves disposed behind the die. The material was then extruded into a water bath after which it was chopped. The pelletized product was molded into a test shape which was found to have an elongation of 8%. The pellets were also molded to form an impact bar which when subjected to the notched Izod impact test was found to have a value of 0.9 ft. lbs.

In applying this process to resins of the acrylonitrile-butadiene-styrene type (see Example VII), it is important, as a practical matter, to take special precautions to get good yield, sufficiently high heat distortion and favorable melt index, since the acrylonitrile has a tendency to give poor workability and its water solubility seems to influence the reaction. However, with chain transfer agents and carefully chosen reaction conditions, good results are obtained, as is shown in the following examples.

EXAMPLE XVII 0.67 part of polyvinyl alcohol and .0025 part sodium dodecyl benzene sulfonate (Nacconol NRSF) were dissolved in 220 parts of distilled water. To this mixture was added 50 parts of 60% solids polybutadiene latex. The batch was then agitated intensively, during which a catalyzed monomer mixture was added consisting of 45 parts styrene monomer, 25 parts acrylonitrile monomer, 1 part lauroyl peroxide and 0.1 part n-dodecyl mercaptan. The batch was intensively agitated for about 10 minutes and while continuing intensive agitation 0.31 part glacial acetic acid was gradually added to reduce pH from 9 to 4.25. The emulsion was partially coagulated. After 6 minutes of continued agitation the mixture was charged into a reactor and polymerized at 80° C. with sufficient agitation to maintain the disperse phase in suspension. Polymerization was carried out for 14 hours with an anti-oxidant, i.e. 4,4′ thiobis-(6-t-butyl metacresol). The polymer in the form of granular beads was then washed, filtered and dried.

Moldings had tensile strength of 3290 p.s.i., elongation of 108%, Shore Hardness 68–67, Izod impact of 6.9 ft. lbs./inch of notch.

EXAMPLE XVIII

An aqueous medium was prepared comprising 200 parts of water, 0.35 part polyvinyl alcohol and 0.35 part sodium dioctyl sulfosuccinate. To this medium was added 45.8 parts of 60% solids polybutadiene latex with intensive agitation. A catalyzed monomer mixture was introduced into the aqueous medium; the monomer consisted of 26.6 styrene monomer, 24 parts alpha methyl styrene monomer, 21.9 parts of acrylonitrile monomer with 1 part t-butyl hydroperoxide and 0.05 part normal dodecyl mercaptan. This combination was thoroughly stirred for approximately 10 minutes and then acidified slowly with 0.30 part glacial acetic acid to convert the emulsion to suspension. Thereafter the suspension was polymerized at 80° C. for 14 hours. A 95% polymer conversion was obtained in the form of small granular particles, the majority of which were 80 mesh or smaller in size. After filtering, washing and drying the polymer was compression molded and exhibited physical properties similar to polymers prepared by other processes. The impact strength was 10.5 ft. lbs./inch of notch.

EXAMPLE XIX

An aqueous medium was prepared comprising 220 parts of water, 0.67 part polyvinyl alcohol and 0.003 part sodium dodecyl benzene sulfonate, 50 parts of 60% solids polybutadiene latex was stirred into this aqueous medium and thoroughly intermixed therewith. A catalyzed monomer was added while the medium was being intensively agitated. The monomer consisted of 45 parts alpha methyl styrene, 25 parts acrylonitrile and 0.70 part t-butyl hydroperoxide, 0.35 part sodium formaldehyde sulfoxylate, and 0.05 part n-dodecyl mercaptan. The batch was intensively agitated for a 10 minute period. Thereafter while continuing the agitation 0.40 part of glacial acetic acid was slowly added to neutralize the emulsifying soaps of the latex, bringing the final pH to a value of about 4. This suspension was then polymerized at 80° C. for 14 hours while utilizing mild agitation. A granular polymer was obtained which was readily processable. Impact strength was 5.7 ft. lbs./inch of notch.

EXAMPLE XX

A monomer mixture was prepared consisting of:

|  | grams |
|---|---|
| Styrene monomer | 15.3 |
| Vinyl toluene | 15.3 |
| Acrylonitrile | 15.3 |
| Butyl stearate | 1 |
| Lauroyl peroxide | 0.7 |

The following materials were placed in another mixing container fitted with a dispersator-agitator:

|  | grams |
|---|---|
| Polybutadiene-styrene 77/23 latex inhibited with dithiocarbamate instead of the usual hydroquinone (24% solids) | 99 |
| Polyvinyl alcohol (5%) | 4 |
| Sodium propyl phosphate (5%) | 1.2 |

The monomer mix was then added to the aqueous phase and mixed for 10 minutes. Approximately 8 cc. of 2% hydrochloric acid was added with rapid stirring to coagulate the mix into the basic round particle structure. 3 cc. 5% polyvinyl alcohol additional was then added and the mix was charged to a reactor, flushed with nitrogen and heated 90° C. for 17 hours without agitation. The resulting polymer consisted of round particles.

Having thus described this invention, what is claimed is:

1. Method of making granular rubber-based ethylenic impact polymers in granular form which comprises adding to a liquid suspending system a rubber latex and catalyzed monomer, partially coagulating the disperse phase to obtain suspension size particles and polymerizing.

2. Method of making granular rubber-based ethylenic impact polymers in granular form which comprises adding to a liquid suspending system a rubber latex and catalyzed monomer, partially coagulating the disperse phase to a stable suspension in which there is no further substantial increase in particle size and polymerizing.

3. Method of making granular rubber-based ethylenic impact polymers in granular form which comprises introducing into an aqueous medium, a rubber latex and catalyzed monomer, coalescing the disperse phase into generally discrete suspension size particles and thereafter polymerizing.

4. Method of making granular rubber-based ethylenic impact polymers in bead form comprising dispersing an elastomer latex and catalyzed ethylenic monomer in an aqueous medium containing a suspending agent, uniformly partially coagulating the disperse phase to obtain a suspension of spehrical particles greater than colloidal size, and thereafter polymerizing the disperse phase while maintaining said particles in suspension.

5. Method of making granular rubber-based ethylenic impact polymers in bead form comprising the steps of dispersing in an aqueous medium containing a liquid suspending agent a catalyzed ethylenic monomer and an elastomer latex, uniformly neutralizing the emulsifying agent of the latex so as to avoid complete coagulation while converting the disperse phase to physically homogeneous spherical particles greater than colloidal size and not less than 0.005 inch in diameter, and polymerizing while maintaining said spherical particles in suspension to obtain a granular polymer in which the elastomer content is greater than 20% by weight.

6. Method of making graft polymers comprising forming an emulsion in an aqueous medium of an elastomer latex and an ethylenic monomer, converting the emulsion to a suspension in which the disperse phase is in the form of spehrical particles greater than colloidal size and thereafter polymerizing said particles in suspension.

7. Method of graft polymerizing ethylenic monomers on elastomer backbones comprising the steps of forming an emulsion containing an anionic elastomer latex and catalyzed ethylenic monomer in an aqueous medium containing a suspending agent, intensively agitating said emulsion, and while so agitating adding an acid acting material for neutralizing the emulsifying agent of the latex, said acid acting material being added to reduce the pH of the emulsion from a value substantially greater than 7 to a value substantially less than 7 whereby the disperse phase is converted to essentially spehrical particles of greater than colloidal size, and thereafter polymerizing in suspension said disperse phase without discernable agglomeration.

8. Method of making graft polymers as set forth in claim 7 in which the acid acting material is slowly added until the pH of the dispersion is reduced to about 4.

9. Method of graft polymerizing ethylenic monomers on elastomer backbones comprising the steps of forming an emulsion containing an anionic elastomer latex and catalyzed ethylenic monomer in an aqueous medium containing a suspending agent, agitating the emulsion, while agitating adding a multivalent metal ion to convert the dispersed phase of particles of suspension size, and polymerizing the suspension.

10. Method of making graft polymers of ethylenic monomers on elastomer backbones comprising the steps of forming an emulsion containing an elastomer latex and at least one catalyzed ethylenic monomer in an aqueous medium containing a suspending agent, agitating said emulsion with sufficient intensity to cause partial coagulation of the disperse phase and thereafter polymerizing said disperse phase in suspension.

11. Method of making acrylonitrile-butadienestyrene terploymers comprising the steps of dispersing in an aqueous medium containing a suspending agent, rubber latex and a catalyzed mixture of acrylonitrile and a styrene, partially coagulating the disperse phase to obtain particles of greater than colloidal size and thereafter polymerizing the suspension.

12. Method of making acrylonitrile-butadienestyrene terploymers as set forth in claim 11 in which said partial coagulation is accomplished by intensive agitation accompanied by addition of an acid acting material for neutralizing the emulsifying agent of the latex, said acid acting material being added to reduce the pH of the emulsion from a value substantially greater than 7 to substantially less than 7.

References Cited

UNITED STATES PATENTS

| | | | |
|---|---|---|---|
| 3,062,777 | 11/1962 | Allen et al. | 260—876 |
| 2,948,703 | 8/1960 | Schroeder | 260—880 |
| 3,047,534 | 7/1962 | Dyer et al. | 260—880 |
| 3,168,593 | 2/1965 | Fremon et al. | 260—880 |
| 3,213,159 | 10/1965 | Adomaitis | 260—876 |

MURRAY TILLMAN, *Primary Examiner.*

D. J. BREZNER, M. J. TULLY, *Assistant Examiners.*